(12) United States Patent
Sommerfeld

(10) Patent No.: US 7,287,655 B2
(45) Date of Patent: Oct. 30, 2007

(54) ENERGY DISSIPATING ELASTOMER DAMPER

(75) Inventor: Howard Sommerfeld, Oak Forest, IL (US)

(73) Assignee: WABTEC Holding Corp., Wilmerding, PA (US)

( * ) Notice: Subject to any disclaimer, the term of this patent is extended or adjusted under 35 U.S.C. 154(b) by 214 days.

(21) Appl. No.: 11/030,656

(22) Filed: Jan. 6, 2005

(65) Prior Publication Data

US 2005/0167385 A1 Aug. 4, 2005

Related U.S. Application Data

(60) Provisional application No. 60/534,757, filed on Jan. 7, 2004.

(51) Int. Cl.
*B61G 9/00* (2006.01)

(52) U.S. Cl. ...................................................... 213/64

(58) Field of Classification Search ............. 213/75 R, 213/62 R, 64, 46 R; 267/153, 292, 293
See application file for complete search history.

(56) References Cited

U.S. PATENT DOCUMENTS

| 2,846,211 | A | | 8/1958 | Taylor |
| 5,501,347 | A | | 3/1996 | Merker, Jr. et al. |
| 6,446,820 | B1 | * | 9/2002 | Barker et al. ............. 213/75 R |
| 6,488,162 | B1 | * | 12/2002 | Carlstedt ................. 213/75 R |
| 6,681,943 | B2 | * | 1/2004 | Barker et al. ............. 213/75 R |

FOREIGN PATENT DOCUMENTS

JP 62110038 5/1987

\* cited by examiner

*Primary Examiner*—S. Joseph Morano
*Assistant Examiner*—Robert J. McCarry, Jr.
(74) *Attorney, Agent, or Firm*—James Ray & Assoc.

(57) ABSTRACT

An energy dissipating elastomer damper comprises a generally hollow housing member having an interior aperture of a predetermined cross section. A first closure member is attached to one end of the housing and has an axial aperture and a second closure member is attached to the other end of the housing and has an axial aperture. A compressible resilient elastomer member is disposed within the interior aperture of the housing. A force transmitting member is disposed for axial movement within the compressible resilient elastomer member and has at least one spherical force transmitting portion of a predetermined shape disposed intermediate a first end extending through the axial aperture of the first closure member and a second end extending through the axial aperture of the second closure member. A force applied to one end of the force transmitting member causes compression of the compressible resilient elastomer member around the force transmitting member thus providing a resistance to movement thereof and absorbing and dissipating the energy of the applied force. The resistance to movement remains constant during the entire range of the travel.

14 Claims, 2 Drawing Sheets

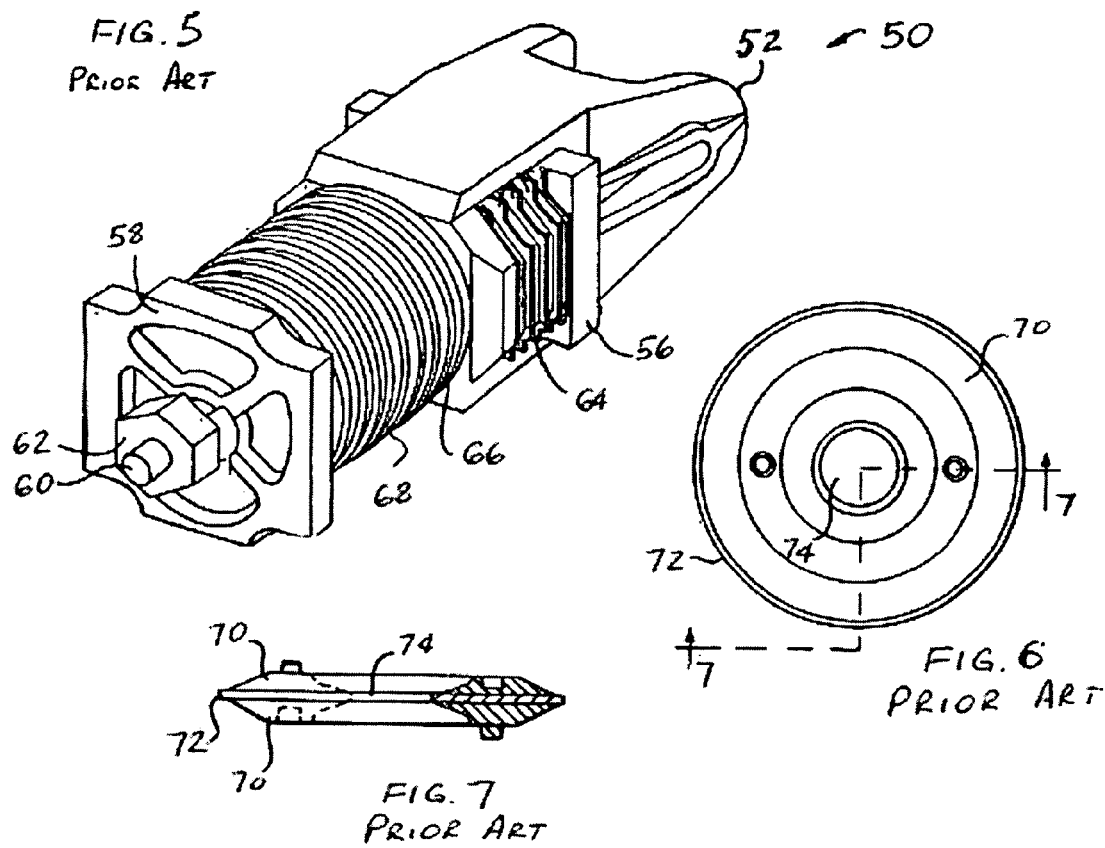
FIG. 5 PRIOR ART
FIG. 6 PRIOR ART
FIG. 7 PRIOR ART
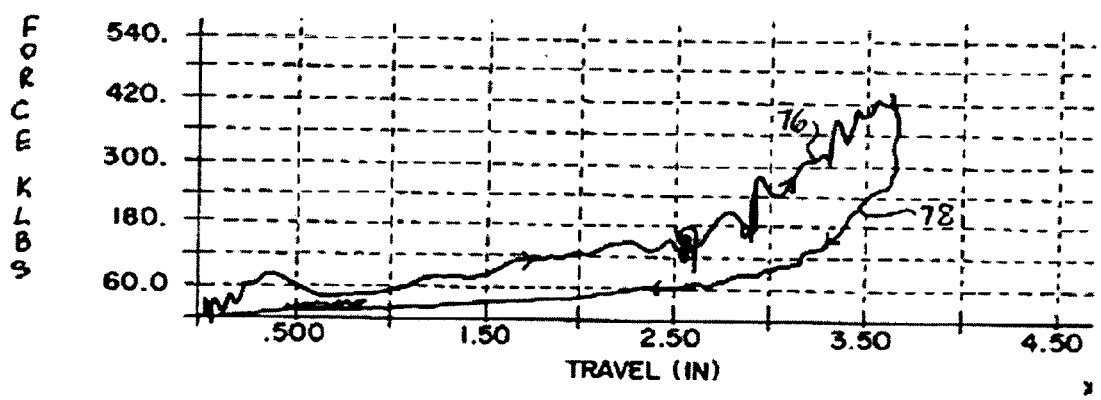
FIG. 8 PRIOR ART

ENERGY DISSIPATING ELASTOMER DAMPER

CROSS-REFERENCE TO RELATED APPLICATIONS

This application is related to and claims priority from U.S. Provisional Patent Application Ser. No. 60/534,757 filed on Jan. 7, 2004.

FIELD OF THE INVENTION

The present invention relates, in general, to a shock absorbing damper having energy dissipating capabilities and, more particularly, the instant invention relates to an energy dissipating damper employing an elastomer or polymer member to dissipate energy without a recoil action and, still more particularly, the invention relates to an energy dissipating damper suitable for use within a draft gear of a railway car.

BACKGROUND OF THE INVENTION

Generally, elastomers have an inherent ability to resist compression with a very high amount of resistant force, often exhibiting a much higher spring rate in the compressed state than that of well known spring steel. That is why elastomers have been widely used in applications requiring shock absorption. However, one of the major disadvantages of using only an elastomer as a shock absorber is its inherent characteristic of returning the applied force back into the system thus causing recoil.

Typically, an elastomer is used in conjunction with a steel casing to provide shock absorbing capabilities to reduce the recoil action. U.S. Pat. No. 5,495,923 to M. Bruski et al and U.S. Pat. No. 4,591,030 to R. Antkowiak teach an elastomeric shock absorber having a compressible elastomer member disposed within a cylindrical chamber and abutting the piston surface as described in U.S. Pat. No. 4,591,030 or enclosed about a piston rod as described in U.S. Pat. No. 5,495,923. In either example, the elastomer member is compressed by the piston during shock absorption. The shock absorber taught in U.S. Pat. No. 5,495,923 further contains a variety of flow communication ports to dispose the elastomer material from the first chamber to the second chamber during shock absorption and enable return flow during the return motion of the piston. The disadvantages of such shock absorbers include the complexity of the design, necessity to assure proper piston guidance and alignment and the necessity to seal both ends of the cylinder's casing in order to achieve proper operation.

Lately, the use of the elastomers has been permeated in the art of draft gears used in the ends of railway freight cars.

U.S. Pat. No. 6,446,820 to R. Barker et al teaches one type of draft gears utilizing a series of generally hollow elastomeric spring pads to absorb shocks in draft and buff conditions.

This type draft gear generally includes a rear compressible resilient member disposed between a rear follower and a yoke portion and a front compressible resilient member disposed within the yoke and associated with a coupler follower. A center rod extends through the yoke portion, through the rear compressible resilient member and through the rear follower. Both the front and rear compressible resilient members are comprised of a stack of elastomeric pads. The design does not utilize a steel housing and steel friction members, thus resulting in reduced draft gear assembly weight.

In draft, only the front stack of pads is loaded, as the yoke is moving toward the coupler follower which is abutting a pair of front stops, however in buff, both stacks of pads are loaded as the coupler follower is first moving toward the yoke and further causing the yoke to move in a direction of the rear follower which is abutting a pair of rear stops.

It has been discovered, such type draft gears have a low efficiency in retaining the absorbed shocks and therefore produces undesirable recoil action.

Therefore, it is desirable to employ simple shock absorbing devices providing improved reliability and reduced recoil action.

SUMMARY OF THE INVENTION

In a first embodiment, the present invention provides an energy dissipating elastomer damper comprises a generally hollow housing member having an interior aperture of a predetermined cross section. The material of the housing member is metal and the preferred shape is cylindrical. A first closure member is attached to one end of the housing and has an axial aperture. A second closure member is attached to the other end of the housing and has an axial aperture. A compressible resilient elastomer member is disposed within the interior aperture of the housing. In the preferred embodiment, such compressible resilient elastomer member is a high performance engineered elastomer such as Hytrel thermoplastic polyester elastomer. A force transmitting member is disposed for axial movement within the compressible resilient elastomer member and has at least one spherical force transmitting portion of a predetermined shape disposed intermediate a first end extending through the axial aperture of the first closure member and a second end extending through the axial aperture of the second closure member. The preferred material of the force transmitting member is metal. The diameter of the spherical force transmitting portion is greater than either the diameter of the first end or the diameter of the second end with the difference defining the compression level of the compressible resilient elastomer member. A retaining member threadably engages one end of the force transmitting member. A force applied to one end of the force transmitting member causes compression of the compressible resilient elastomer member around the force transmitting member thus providing a resistance to movement thereof and absorbing and dissipating the energy of the applied force. The resistance to movement remains constant during the entire range of the travel.

In a second embodiment, the present invention provides an energy dissipating elastomer damper for use within a draft gear assembly of a railway car. The draft gear assembly includes a yoke extending toward a front end of the draft gear assembly. A coupler follower is disposed within the yoke and engages the coupler of the railway car. A rear follower is disposed adjacent a rear end of the draft gear assembly. A front compressible resilient member is disposed within the yoke and engages the coupler follower during operation. A rear compressible resilient member is disposed intermediate the yoke and the rear follower and has at least one rear elastomeric spring pad formed by a pair of elastomer pads bonded to a centrally disposed steel ring plate and having a through aperture at a center thereof. The energy dissipating elastomer damper is generally disposed within the center aperture and has a force transmitting member attached to the yoke at the first end. The second end of the force transmitting member extends through the rear follower and engages a threadable shortening member of the draft gear assembly. In operation the energy dissipating elastomer damper increases the buff impact load capacity of the draft gear assembly during compression of the rear resilient member and reduces the energy during and expansion in response to a buff impact load, thus reducing the recoil action of the draft gear assembly.

OBJECTS OF THE INVENTION

It is therefore a primary object of the invention to provide an energy dissipating elastomer damper which dissipates impact energy.

It is a further object of the invention to provide an energy dissipating elastomer damper which does not store absorbed shock energy.

It is another object of the present invention to provide an energy dissipating elastomer damper which is suitable for use within a draft gear of a railway vehicle and which reduces recoil action after shock absorption.

Although a number of objects and advantages of the present invention have been described in some detail above, various additional objects and advantages of the energy dissipating elastomer damper of the present invention will become more readily apparent to those persons who are skilled in the art from the following more detailed description of the invention, particularly, when such detailed description of the invention is taken in conjunction with both the attached drawing figures and with the appended claims.

BRIEF DESCRIPTION OF THE DRAWINGS

FIG. 5 is a perspective view of a prior art draft gear assembly;

FIG. 6 is a plan view of the prior art rear resilient member;

FIG. 7 is a view of the prior art rear resilient member of FIG. 6, taken along lines 7-7 in FIG. 6; and FIG. 8 is diagrammatic representation of the dynamic impact plots for buff impact of the prior art draft gear, with front and back resilient members operating in series and an impact speed of 5.48 mph.

DETAILED DESCRIPTION OF VARIOUS EMBODIMENTS OF THE INVENTION

Figure 1:
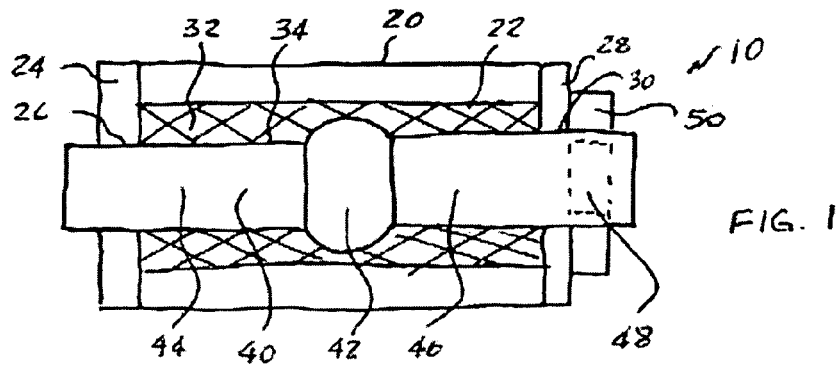
FIG. 1 is a layout of an energy dissipating elastomer damper constructed according to the a presently preferred embodiment of the invention.

Prior to proceeding with the more detailed description of the invention it should be noted that for the sake of clarity and understanding the invention, identical components which have identical functions have been identified with identical reference numerals throughout the several views illustrated in the attached drawing Figures.

Referring now to FIG. 1, an energy dissipating elastomer damper, generally designated 10, comprises a hollow housing 20 of a predetermined size, shape and material having an interior aperture 22 of a predetermined cross section. The preferred material is metal, and the preferred shape is substantially cylindrical. The preferred predetermined cross section of the interior aperture 22 is round.

A first closure member 24 having a second axial aperture 26 is removably attached to a first end of the housing 20 with any well known attachment means including but not limited to fastening, welding, brazing or employing complimentary thread means. Alternatively, the first closure member 24 may be integral to such housing 20.

A second closure member 28 having a third axial aperture 30 is removably attached to an opposed second end of the housing 20 with any of such well known attachment means. Preferably, the second and third axial apertures 26 and 28 are aligned.

A compressible force absorbing means 32 fills the interior aperture 22 of the housing 20 and is preferably a resilient elastomer 32 having a predetermined hardness and, more preferably, the elastomer 32 is a high performance engineered elastomer such as Hytrel thermoplastic polyester elastomer, manufactured by Du Pont Company of Wilmington, Del.

A force transmitting means 40 is disposed within the axial aperture 34 of the elastomer 32 and includes at least one force transmitting portion 42 which is preferably at least partially spherical and has a first predetermined diameter. The at least one force transmitting portion 42 is disposed intermediate a first end 44 of a second predetermined diameter which extends through the first axial aperture 26 and a second end 46 of a third predetermined diameter which extends through the second axial aperture 30. Advantageously, the third predetermined diameter and the second predetermined diameter are equal and both less than the first predetermined diameter of the at least one force transmitting portion 42. The second end 46 may be adapted to receive a retaining means 50 which abuts the second closure member 28 in the normal non activated position. The preferred material of the force transmitting means 40 is metal. Preferably, such retaining member is a well known threaded nut 50 and such second end 46 is provided with a threaded portion 48 for receiving such nut 50.

In operation, a force applied to the first end 44 of the force transmitting means 40 causes a linear movement thereof within the force absorbing means 32 at a predetermined speed rate. During movement, the force absorbing means 32 compresses around the at least one force transmitting portion 42 and the first and second end 44 and 46, respectively, thus providing a resistance to the movement of the force transmitting means 40 and absorbing the energy of the applied force. As best illustrated in FIG. 2, the resistance to movement remains generally constant during the range of travel.

As it has been determined during testing, the ratio between the first predetermined diameter of the at least one force transmitting portion 42 and the second and third predetermined diameters of the first and second ends 44 and 46, respectively, defines the compression of the force absorbing means 32 with the higher ratio resulting in a higher compression and, more particularly, resulting in an increased capacity of the energy dissipating elastomer damper 10.

Figure 2:
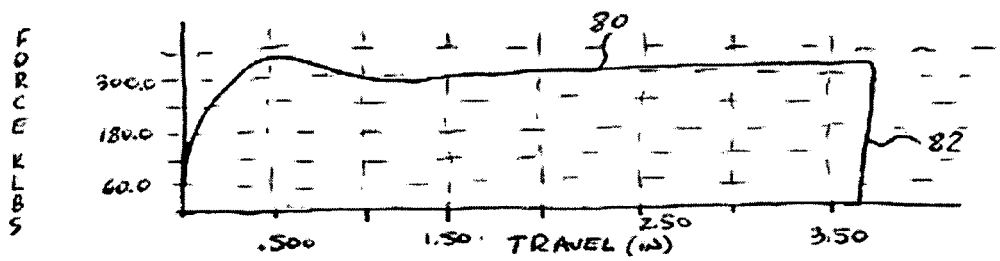
FIG. 2 is a diagrammatic representation of the dynamic impact plots of the energy dissipating elastomer damper at 50% elastomer member compression, for the same energy input.
Figure 3:
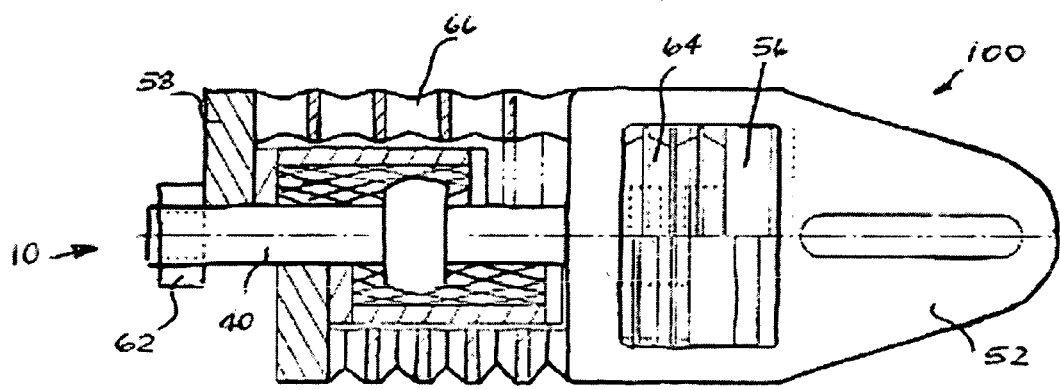
FIG. 3 is a layout, partially in cross-section, of the draft gear assembly of the present invention incorporating the energy dissipating elastomer damper in FIG. 1.

Now in particular reference to FIG. 2, there is shown a dynamic impact plot of the energy dissipating elastomer damper 10 at 50% compression of the force absorbing means 32 with the first and second end 44 and 46, respectively, being equal to 2.66 inches. The first curve 80 illustrates the action of the force absorbing means 32 during compression and the second curve 82 illustrates the action of the force absorbing means 32 during expansion following compression. Of particular importance is the generally vertical second curve 82 illustrating that approximately the entire impact energy is absorbed and dissipated by the energy dissipating elastomer damper 10.

Those skilled in the art will understand that reactionary spring back forces of the force absorbing means 32 during movement of the force transmitting means 40 act radially with respect to the longitudinal axis of such force transmitting means 40 thus preventing the force transmitting means 40 moving in the opposite direction. Therefore, force absorbing means 32 enables the energy dissipating elastomer damper 10 to dissipate the impact energy applied to either end of the force transmitting means 40. Accordingly, external forces must be applied to move the force transmitting means 40 in the opposite direction.

Additionally, it was discovered that such increased capacity will be achieved by increasing the predetermined cross section of the aperture 22 and subsequent increase of the cross section of the force absorbing means 32, increasing the first predetermined diameter of the at least one force transmitting portion 42, increasing the hardness of the force absorbing means 32 or utilizing a plurality of the force transmitting portions 42 serially disposed intermediate the first and second ends 44 and 46, respectively. It will be appreciated that a combination of the capacity increasing factors can be utilized.

The use of the energy dissipating elastomer damper 10 will be shown in combination with a draft gear assembly as those skilled in the relevant art will understand its use in other applications.

To help the reader in understanding the present invention, a prior art draft gear assembly, generally designated 50, for use with a standard E-coupler as taught in U.S. Pat. No. 6,446,820 is illustrated in FIGS. 5-8. In particular reference to FIG. 5, such draft gear assembly 50 has front and rear ends and includes a yoke 52 extending toward the front end, a coupler follower 56 disposed within the yoke 52, a rear follower 58 disposed adjacent the rear end, a center rod 60 connected to the yoke 52 at one end, a shortening member 62 threadably engaging the center rod 60 at a second end thereof and abutting the rear follower 58, a front compressible resilient member 64, and a rear compressible resilient member 66 having at least one rear elastomeric spring pad 68.

As shown in FIGS. 6 and 7, each rear pad 68 comprises two elastomer pads 70 bonded to a central steel ring plate 72. Each rear elastomer pad 70 has a through aperture 74 at its center with a sufficient diameter for the center rod 60 to pass through. Each illustrated rear elastomer pad 70 for the rear compressible resilient member 66 is generally circular, as shown in FIG. 6.

In operation, with particular reference to a buff condition, both the front and back resilient members 64 and 66, respectively, will operate in series reacting to a dynamic buff impact load in a manner as generally represented by curves 76 and 78 in FIG. 8. The upper curve 76 illustrates the action of the two resilient members 64 and 66 during compression, and the lower curve 78 indicates the action of the two resilient members 64 and 66 during expansion following compression. The complete cycle of compression and expansion in response to a buff impact comprises a hysteresis loop, shown in FIG. 8, with energy being dissipated during the cycle and enabling the elastomer stacks to operate not only as springs, but also as damping members.

As it can be seen in FIG. 8, relatively high forces remain between approximately 3.50 inches and 1.50 inches of a return travel, represented by the lower curve 78, as the impact energy is not substantially dissipated by the rear resilient members 66 which, as is well known, results in the reduced efficiency of the draft gear 50 and, more particularly, results in the undesired recoil action.

Now in particular reference to FIG. 2, the draft gear assembly of the present invention, generally designated 100, includes the energy dissipating elastomer damper 10 which is disposed within the rear resilient member 66 and, more particularly, disposed within the aperture 74 which is enlarged to accommodate such energy dissipating elastomer damper 10. The force transmitting means 40 replaces the center rod 60 and is rigidly attached to the yoke 52 at the first end 44 and is threadably engaged to the shortening member 62 at the second end 46.

In operation, the energy dissipating elastomer damper 10 cooperates with the front and back resilient members 64 and 66 to absorb impact energy in the buff condition and cooperates with the front resilient member 64 to absorb impact energy in the draft condition.

Figure 4:
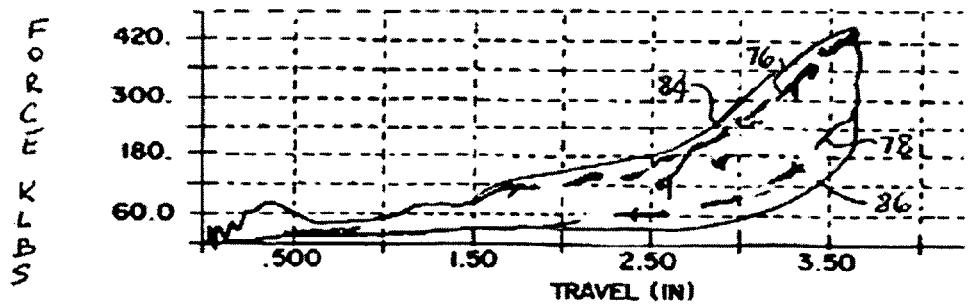
FIG. 4 is diagrammatic representation of the dynamic impact plots for buff impact of the draft gear assembly of FIG. 2.

In a particular reference to FIG. 4, the tendency of the impact energy which is absorbed and stored by the rear resilient member 66 to recoil the yoke 52 is dampened by the friction resistance of the force absorbing means 32 and force transmitting means 40 of the energy dissipating elastomer damper 10, as best illustrated by a lower curve 86, thus reducing the recoil action of the draft gear assembly 100 and, more particularly, reducing the severity of the secondary impacts of the coupler (not shown).

It will be appreciated that the spring back force of the rear resilient member 66 must be sufficient to overcome the resistance of the force absorbing means 32 in order to return the force transmitting means 40 to its original position.

Advantageously, as best illustrated by an upper curve 84 in FIG. 4, the energy dissipating elastomer damper 10 enables the draft gear assembly 100 to sustain a higher dynamic buff impact load.

Those skilled in the art will readily understand that the first closure member 24 may be disposed integrally within the yoke 12.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. An energy dissipating elastomer damper comprising:
   (a) a generally hollow housing member having an interior aperture of a predetermined cross section;
   (b) a first closure member attached to one end of said housing and having a first axial aperture;
   (c) a second closure member attached to radially opposed end of said housing and having a second axial aperture;
   (d) a compressible force absorbing means disposed within said interior aperture of said housing; and
   (e) a force transmitting means disposed within an axial aperture of said compressible force absorbing means and axially movable therein, said force transmitting means having at least one force transmitting portion of a predetermined shape disposed intermediate a first end having a first predetermined diameter and a second end having a second predetermined diameter, said first predetermined diameter being greater than each of said second predetermined diameter and said third predetermined diameter, said first end extending through said first axial aperture of said first closure member and said second end extending through said second axial aperture of said second closure member.

2. The energy dissipating elastomer damper according to claim 1, wherein a shape of said housing is a cylindrical.

3. The energy dissipating elastomer damper according to claim 2, wherein said housing is elongated.

4. The energy dissipating elastomer damper according to claim 1, wherein a material of said housing is metal.

5. The energy dissipating elastomer damper according to claim 1, wherein said predetermined cross section of said interior aperture is round.

6. The energy dissipating elastomer damper according to claim 1, wherein said first axial aperture of said first closure means and said second axial aperture of said second closure means are aligned.

7. The energy dissipating elastomer damper according to claim 1, wherein said force absorbing means is a resilient elastomer having a predetermined hardness.

8. The energy dissipating elastomer damper according to claim 7, wherein said resilient elastomer is a high performance engineered thermoplastic polyester elastomer.

9. The energy dissipating elastomer damper according to claim 1, wherein said first predetermined diameter of said first end of said force transmitting means and said second predetermined diameter of said second end of said force transmitting means are substantially equal.

10. The energy dissipating elastomer damper according to claim 1, wherein said predetermined shape of said at least one force transmitting portion is at least partially spherical.

11. The energy dissipating elastomer damper according to claim 1, wherein a material of said force transmitting means is metal.

12. The energy dissipating elastomer damper according to claim 1, wherein said energy dissipating elastomer damper includes a retaining means engaging one of said first end and said second end of said force transmitting means.

13. A railway car draft gear assembly which enables the cushioning of buff and draft shocks that are usually encountered in railway car rolling stock during a coupling operation of such railway car to a train consist and during normal operation of such train consist on a track structure, such buff and draft shocks transmitted by a coupler of such railway car engageable with said draft gear assembly, said draft gear assembly comprising:

(a) a yoke extending toward a front end of said draft gear assembly;

(b) a coupler follower disposed within said yoke;

(c) a rear follower disposed adjacent a rear end of said draft gear assembly;

(d) a front compressible resilient member disposed within said yoke and engageable with said coupler follower;

(e) a rear compressible resilient member disposed intermediate said yoke and said rear follower and including at least one rear elastomeric spring pad, said at least one rear elastomeric spring pad having a pair of elastomer pads bonded to a centrally disposed steel ring plate, each of said pair of said elastomer pads has a through aperture at a center thereof;

(f) an energy dissipating elastomer damper disposed within said center aperture of said at least one rear elastomeric spring pad of said rear compressible resilient member, said energy dissipating elastomer damper including a generally hollow housing member having an interior aperture of a predetermined cross section, a first closure member attached to one end of said housing and having a first axial aperture, a compressible force absorbing means disposed within said interior aperture of said housing and a force transmitting means disposed within an axial aperture of said compressible force absorbing means and axially movable therein, said force transmitting means having at least one force transmitting portion of a predetermined shape and a first predetermined diameter disposed intermediate a first end of a second predetermined diameter and a second end of a third predetermined diameter, said first end attached to said yoke and said second end extending through said axial aperture of said first closure member and through said rear follower; and (g) a shortening member treadably engaging said second end of said force transmitting member and abutting said rear follower.

14. The draft gear assembly according to claim 13, wherein said draft gear assembly includes a second closure member disposed adjacent said yoke and having a second axial aperture enabling passage of said first end of said force transmitting means.

* * * * *